US011029966B1

(12) United States Patent
Vajravel et al.

(10) Patent No.: US 11,029,966 B1
(45) Date of Patent: Jun. 8, 2021

(54) DYNAMICALLY CONFIGURING A COMPUTING SYSTEM TO OPERATE WITH AN EXTERNAL GPU CONNECTED VIA USB-C

(71) Applicant: Dell Products L.P., Round Rock, TX (US)

(72) Inventors: Gokul Thiruchengode Vajravel, Bangalore (IN); Vivek Viswanathan Iyer, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/747,776

(22) Filed: Jan. 21, 2020

(51) Int. Cl.
*G06F 9/4401* (2018.01)
*G06F 13/42* (2006.01)
*G06F 13/20* (2006.01)
*G06T 1/20* (2006.01)

(52) U.S. Cl.
CPC .......... *G06F 9/4403* (2013.01); *G06F 13/20* (2013.01); *G06F 13/4282* (2013.01); *G06T 1/20* (2013.01); *G06F 2213/0042* (2013.01)

(58) Field of Classification Search
CPC .......... G06F 2009/3883; G06F 9/4411; G06F 13/10; G06F 13/12; G06F 13/20; G06F 13/4282; G06F 15/163; G06F 15/17; G06F 15/177; G06F 2213/0042; G06T 1/20
See application file for complete search history.

(56) References Cited

U.S. PATENT DOCUMENTS

| 2010/0117685 | A1* | 5/2010 | Kong | G06F 13/4072 327/74 |
| 2010/0138590 | A1* | 6/2010 | Chou | G06F 13/105 711/103 |
| 2016/0117793 | A1* | 4/2016 | Sierra | G06T 1/20 345/502 |
| 2018/0068412 | A1* | 3/2018 | Schnell | G06F 13/4068 |
| 2018/0368505 | A1* | 12/2018 | Kidman | A42B 3/04 |
| 2019/0102334 | A1* | 4/2019 | Berchanskiy | G06F 13/4027 |
| 2019/0197824 | A1* | 6/2019 | Timperley | G07F 17/3227 |
| 2019/0270019 | A1* | 9/2019 | Miura | A63F 13/23 |
| 2019/0392548 | A1* | 12/2019 | Nakata | G06F 13/20 |
| 2020/0065934 | A1* | 2/2020 | Tsukamoto | G06F 9/485 |

FOREIGN PATENT DOCUMENTS

WO WO-2020018065 A1 * 1/2020 ........... G06F 3/1438

* cited by examiner

*Primary Examiner* — Thomas J Cleary
(74) *Attorney, Agent, or Firm* — Kirton McConkie; Brian Tucker

(57) ABSTRACT

A computing system can be dynamically configured to operate with an eGPU that is connected to the computing system via a USB-C port. An eGPU manager, which may be a BIOS service, can be provided on a computing system and configured to detect when an eGPU has been connected to a USB-C port. When the eGPU manager detects an eGPU, it can employ an identifier of the eGPU and possibly characteristics of the eGPU and/or the computing system to query a lookup table for values for configuration settings that are optimal for the particular eGPU. The eGPU manager can then set the configuration settings to the obtained values so that the computing system will boot and/or operate properly while the eGPU is connected.

20 Claims, 7 Drawing Sheets

| eGPU ID | eGPU PSU? | AC or DC? (eGPU) | AC or DC? (Computing System) | USB-C Max IO | USB-C Max Power Draw | eGPU Max Power Level |
|---|---|---|---|---|---|---|
| | | | | \multicolumn{3}{c}{Configuration Settings} | | |
| eGPU1 | Yes | AC | AC | 100% | 80% | 80% |
| eGPU1 | Yes | AC | DC | 90% | 70% | 70% |
| eGPU2 | No | DC | AC | 60% | 50% | 40% |
| eGPU3 | Yes | AC | AC | 50% | 50% | 30% |
| eGPU4 | Yes | AC | AC | 100% | 90% | 90% |
| ... | | | | | | |
| Default | Yes | DC | AC | 50% | 50% | 30% |

FIG. 2

DYNAMICALLY CONFIGURING A COMPUTING SYSTEM TO OPERATE WITH AN EXTERNAL GPU CONNECTED VIA USB-C

CROSS-REFERENCE TO RELATED APPLICATIONS

N/A

BACKGROUND

Computing systems, such as desktops and laptops, are oftentimes used for gaming or other graphics-intensive purposes. Oftentimes, these computing systems only have an integrated graphics processing unit (iGPU) which may not perform adequately for gaming. In some cases, it may be possible to add a dedicated (or discrete) graphics processing unit (dGPU) to a computing system to address the performance limitations. However, with some computing systems, particularly laptops, it may not be possible to do so. For example, a laptop's motherboard may not have an available PCI Express x16 connector for adding a dGPU.

Due to these limitations and the prevalence of laptops, it is becoming more common to add an external graphics processing unit (eGPU) to a computing system. Typically, an eGPU will be provided in the form of an enclosure that includes a USB-C controller and a Thunderbolt 3 controller which enable the eGPU to be connected to the computing system via a USB-C port and to communicate via Thunderbolt 3. These enclosures may include a separate power supply unit (PSU) for powering the eGPU and/or may draw power from the computing system using USB-C Power Delivery (PD) techniques.

Unfortunately, when an eGPU is connected to a computing system, there is a high likelihood that the computing system will not boot correctly if at all. This is typically the case when the computing system lacks sufficient resources to support the eGPU. For example, if the BIOS/UEFI cannot allocate sufficient resources to support the eGPU, it may stop the boot process and generate an error code indicative of the lack of resources (e.g., error code 12 in Windows systems). Even if the computing system completes the boot process, it may boot into a black screen due to a failure to configure any GPU appropriately. To address such issues, the end user will typically need to disable the iGPU, dGPU or other peripherals manually to free up sufficient resources to support the eGPU. This is an unpredictable trial and error process. Considering the relatively high cost of eGPUs, many end users may be unwilling to take the risk of purchasing an eGPU that may not be compatible with his or her computing system.

BRIEF SUMMARY

The present invention extends to methods, systems, and computer program products for dynamically configuring a computing system to operate with an eGPU that is connected to the computing system via a USB-C port. An eGPU manager, which may be a BIOS service, can be provided on a computing system and configured to detect when an eGPU has been connected to a USB-C port. When the eGPU manager detects an eGPU, it can employ an identifier of the eGPU and possibly characteristics of the eGPU and/or the computing system to query a lookup table for values for configuration settings that are optimal for the particular eGPU. The eGPU manager can then set the configuration settings to the obtained values so that the computing system will boot and/or operate properly while the eGPU is connected.

In some embodiments, the present invention is implemented by an eGPU manager as a method for dynamically configuring a computing system to operate with an eGPU that is connected to the computing system via a USB-C port. The eGPU manager can detect that an eGPU is connected to a USB-C port of the computing system. In response to the detection, the eGPU manager obtains an identifier of the eGPU and then employs the identifier of the eGPU to query a lookup table to thereby obtain one or more optimal values for one or more configuration settings that are mapped to the identifier of the eGPU. The eGPU manager may then configure the computing system to operate with the eGPU by setting the one or more configuration settings to the one or more optimal values.

In some embodiments, the present invention is implemented as computer storage media storing computer executable instructions which when executed on a computing system implement a method for dynamically configuring the computing system to operate with an eGPU that is connected to the computing system via a USB-C port. This method includes: detecting that an eGPU is connected to a USB-C port of the computing system; in response to the detection, generating a query to obtain one or more values for one or more configuration settings from a lookup table, the query including an identifier of the eGPU; and configuring the computing system to operate with the eGPU by setting the one or more configuration settings to the one or more obtained values.

In some embodiments, the present invention is implemented as computing system that includes a CPU, a USB-C port, and an eGPU manager. The eGPU manager is configured to detect that an eGPU is connected to the USB-C. In response to detecting an eGPU, the eGPU manager obtains an identifier of the eGPU and employs the identifier of the eGPU to query a lookup table to thereby obtain optimal values for configuration settings that are mapped to the identifier of the eGPU. The eGPU manager then configures the computing system to operate with the eGPU by setting the configuration settings to the optimal values.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which:

FIG. 2 illustrates an example of a lookup table;

DETAILED DESCRIPTION

In the specification and the claims, a "computing system" should be construed as any end-user computing device to which an eGPU may be physically connected. The term "BIOS" should be construed as encompassing the Unified Extensible Firmware Interface (UEFI). The term "USB-C port" should be construed as encompassing a USB port (or connector) that adheres to the USB-C industry standard as well as a USB port that adheres to a future industry standard that replaces USB-C. The term "lookup table" should be construed as encompassing any data structure that can be employed to map a set of one or more input values to a set of one or more output values.

Figure 1:
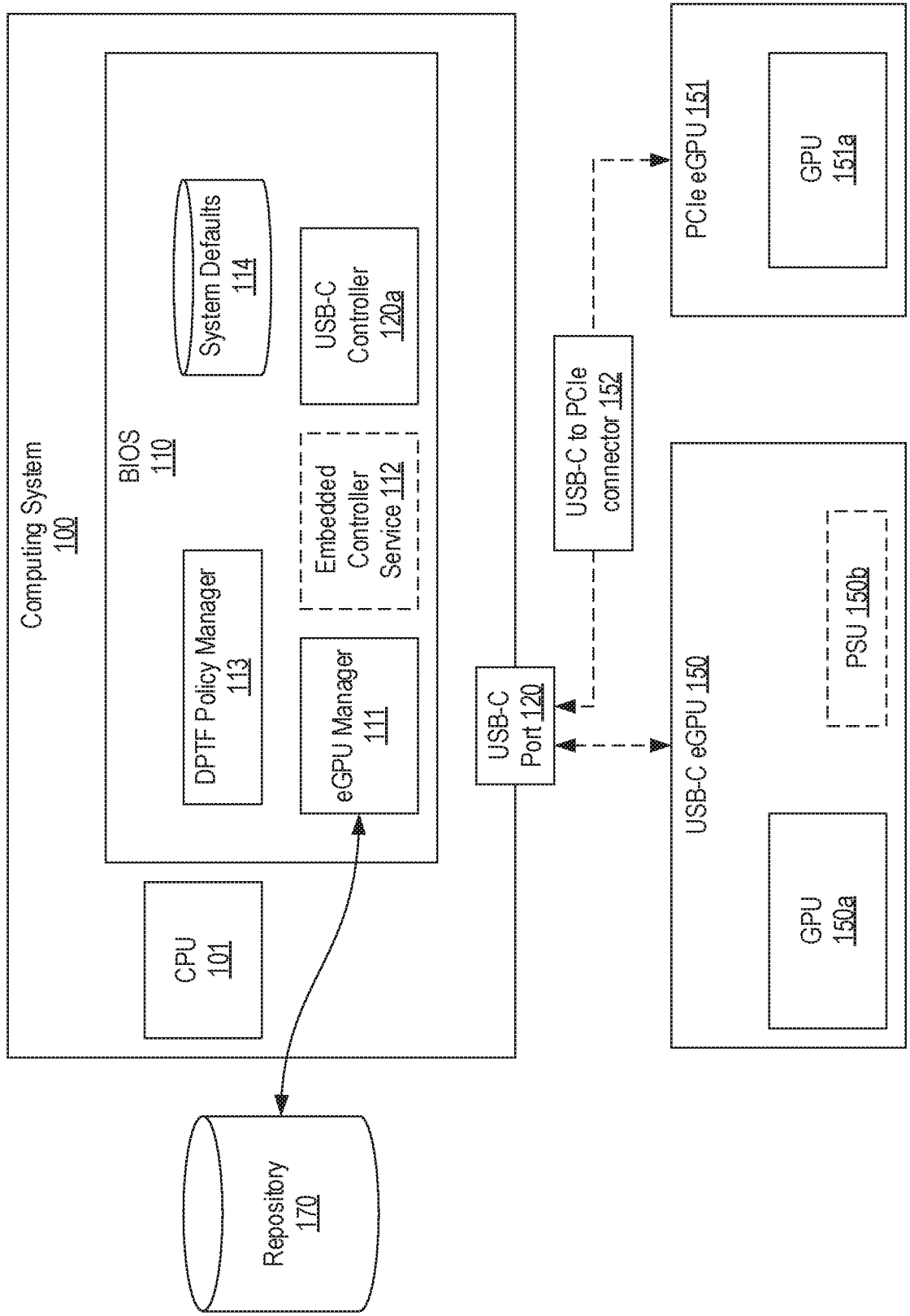
FIG. 1 illustrates example of a computing system that is configured in accordance with embodiments of the present invention.

FIG. 1 illustrates an example of a computing system 100 that is configured in accordance with embodiments of the present invention. Computing system 100 includes a CPU 101, BIOS 110 and a USB-C port 120 that is controlled by a USB-C controller 120a. Computing system 100 would also include memory, various hardware components (e.g., the chipset(s) that implement the Thunderbolt interface over USB-C port 120), an operating system, etc., but such components are not illustrated because they are not essential to an understanding of the present invention.

BIOS 110 includes a number of services including eGPU manager 111, an optional embedded controller service 112 and a dynamic platform and thermal framework (DPTF) policy manager 113. eGPU manager 111 and embedded controller service 112 may represent software that executes both during bootup and runtime. In some embodiments, embedded controller service 112 may comply with the Advanced Configuration and Power Interface (ACPI) embedded controller interface. DPTF policy manager 113 may commonly represent the Intel DPTF, but may also represent other management solutions that are based on the ACPI specification and that function to control the thermal and power settings of CPU 101. In accordance with the ACPI specification, DPTF policy manager 113 employs pre-defined system defaults 114 which provide, among other things, power levels/ranges (e.g., PL1max-PL1min and PL2max-PL2 min) at which CPU 101 will operate when in a particular mode.

Many different types of eGPUs may be connected to USB-C port 120. For example, USB-C eGPU 150, which includes a GPU 150a and possibly a power supply unit (PSU) 150b, may be directly connected to USB-C port 120 via a USB-C cable. In contrast, a PCIe eGPU 151, which includes a GPU 151a but does not include a PSU, may be connected to USB-C port 120 via a USB-C to PCIe connector 152. When an eGPU does not include a PSU, it may be powered via USB-C port 120 in accordance with the USB Power Delivery (USB-PD) standard. Even when an eGPU includes a PSU, it may still draw power from USB-C port 120 (e.g., when the PSU is underpowered and/or when a legacy connector is used). An eGPU may also include a battery that can power the eGPU when the PSU is not available (e.g., when it is not plugged in). In short, an end user may connect many different types of eGPUs to USB-C port 120 and may even employ multiple different configurations for the same eGPU.

In accordance with embodiments of the present invention, eGPU manager 111 can be employed to dynamically configure computing system 100 to operate with an eGPU that is connected via USB-C port 120. In some embodiments, such as when computing system 100 includes an embedded controller that manages USB-C controller 120a, embedded controller service 112 may also be included on computing system 100. For example, embedded controller service 112 can represent a portion of the embedded controller's firmware. In such cases, eGPU manager 111 may interface with embedded controller service 112 to dynamically configure USB-C port 120. In contrast, when possible, eGPU manager 111 may interface directly with USB-C controller 120a.

Repository 170 represents a storage location accessible to eGPU manager 111 where one or more lookup tables are maintained. As described in greater detail below, a lookup table maps eGPU identifiers to values of various configuration settings to thereby enable eGPU manager 111 to dynamically identify and set values of the configuration settings on computing system 100 that are optimal for the particular type of eGPU that the end user has connected to USB-C port 120. As illustrated, repository 170 may be remote to computing system 100 and accessible via a network (e.g., in the cloud). However, in some embodiments, repository 170 could be a storage location on computing system 100.

FIG. 2 provides a simplified example of a lookup table 200 that may be used in embodiments of the present invention. Lookup table 200 defines values of various configuration settings that are optimal for a particular type of eGPU. In this context, optimal values for the configuration settings can be viewed as those that will enable computing system 100 to boot and operate properly when the eGPU is connected to USB-C port 120. Oftentimes, the optimal values for the configuration settings will be less than default values for the configuration settings. As shown, these configuration settings can include two configuration settings specific to USB-C port 120 (max IO speed and max power draw) and a configuration setting specific to CPU 101 (max power level). In some embodiments, including the depicted embodiment, a set of values for the configuration settings in lookup table 200 can be mapped to a particular eGPU identifier as well as to characteristics of the particular eGPU and the computing system. In other embodiments, however, a set of values for the configuration settings may be mapped only to a particular eGPU identifier.

In the example in FIG. 2, each entry (or row) in lookup table 200 identifies an eGPU ID and a number of characteristics of the eGPU or computing system 100 including, for example, whether the eGPU has a power supply unit (PSU), whether the eGPU is being driven by an AC or DC source (e.g., whether the eGPU is plugged in or running on battery) and whether computing system 100 is running on AC or DC power (i.e., whether computing system 100 is plugged in or running on battery). As suggested above, a lookup table may include fewer or more characteristics than what is depicted. Notably, lookup table 200 can include multiple entries for the same type of eGPU. For example, lookup table 200 includes two entries for an eGPU that has an identifier of eGPU1 and that includes an integrated PSU that is currently powering the eGPU: one that defines values for the configuration settings when computing system 100 is plugged in (AC) and one that defines values for the configuration settings when computing system 100 is running on battery (DC). Accordingly, lookup table 200 may define sets of values for the configuration settings for a wide variety of eGPUs and eGPU/computing system characteristics (or states). In addition to the entries that are specific to a particular type of eGPU, lookup table 200 may also include one or more default entries. Such default entries may provide sets of values for the configuration settings for an eGPU that does not map to any other entry in lookup table 200 (e.g., an entry that applies when the lookup table does not have an entry matching the eGPU's ID).

In a typical scenario, lookup table 200 could be created and updated as necessary by the provider of computing system 100 (e.g., Dell, HP, Lenovo, etc.). In such cases, the provider could test the various types of eGPUs on computing systems 100 to determine which values are optimal for the various configuration settings and then populate lookup table 200 accordingly. As mentioned above, lookup table 200 could be maintained in repository 170 where it will be accessible to eGPU manager 111 at bootup and runtime.

eGPU manager 111 can employ any suitable technique to retrieve lookup table 200 from repository 170 and store it locally on computing system 100. For example, eGPU manager 111 can be configured to issue an HTTP query to repository 170 during the boot process (e.g., during the UEFI platform initialization) to thereby obtain the latest version of lookup table 200 for use during the boot process. eGPU 111 may also be configured to periodically send an HTTP query to repository 170 during runtime (i.e., when the operating system is running) to obtain the latest version. In some embodiments, these HTTP queries could specify an identifier of computing system 100 (e.g., the Service Tag on a Dell computing system) which would allow repository to provide a version of lookup table 200 that is customized for computing system 100 (or to provide only the content of lookup table 200 that is applicable to computing system 100). In other words, to account for the different configurations of and available resources on the many different types of computing systems to which an end user may connect an eGPU, repository 170 could maintain versions of lookup table 200 that are specific to particular types of computing systems or otherwise map entries in lookup table 200 to the types of computing systems to which they pertain. As a particular example, a first line of laptops may have minimal resources and therefore a first lookup table that specifies lower values for the configuration settings for eGPUs may be defined. On the other hand, a second line of laptops may have more resources and therefore a second lookup table that specifies higher values for the configuration settings for the same eGPUs may be defined.

Regardless of when and how it retrieves lookup table 200, eGPU manager 111 can store lookup table 200 on computing system 100 so that it will be accessible when/if an eGPU is connected to USB-C port 120. In contrast, in some embodiments, eGPU manager 111 may not obtain the entire lookup table 200, but may instead retrieve on demand only the optimal values for the configuration settings using the information about a connected eGPU and possibly the characteristics of the connected eGPU and computing system 100. For example, during bootup and/or at runtime, eGPU manager 111 may detect that an eGPU is connected to USB-C port 120 and may obtain an identifier of eGPU and discover the various characteristics. eGPU manager 111 may then submit an HTTP request to repository 170 that specifies the eGPU identifier, whether the eGPU has a PSU and whether the eGPU and computing system 100 are running on AC or DC. Repository 170 may use this specified information to find a matching entry in lookup table 200 and then return to eGPU manager 111 the set of values for the configuration settings from the matching entry. Accordingly, there are multiple different ways in which eGPU manager 111 can identify the set of values for the configuration settings that are optimal for a particular type/configuration of an eGPU that is connected to USB-C port 120. Of primary importance is that eGPU manager 111 can dynamically identify the connected eGPU, including the characteristics of the eGPU and/or computing system, and then identify and apply the set of values for the configuration settings that are defined as optimal for the particular computing system when the identified eGPU is connected.

Figure 3A:
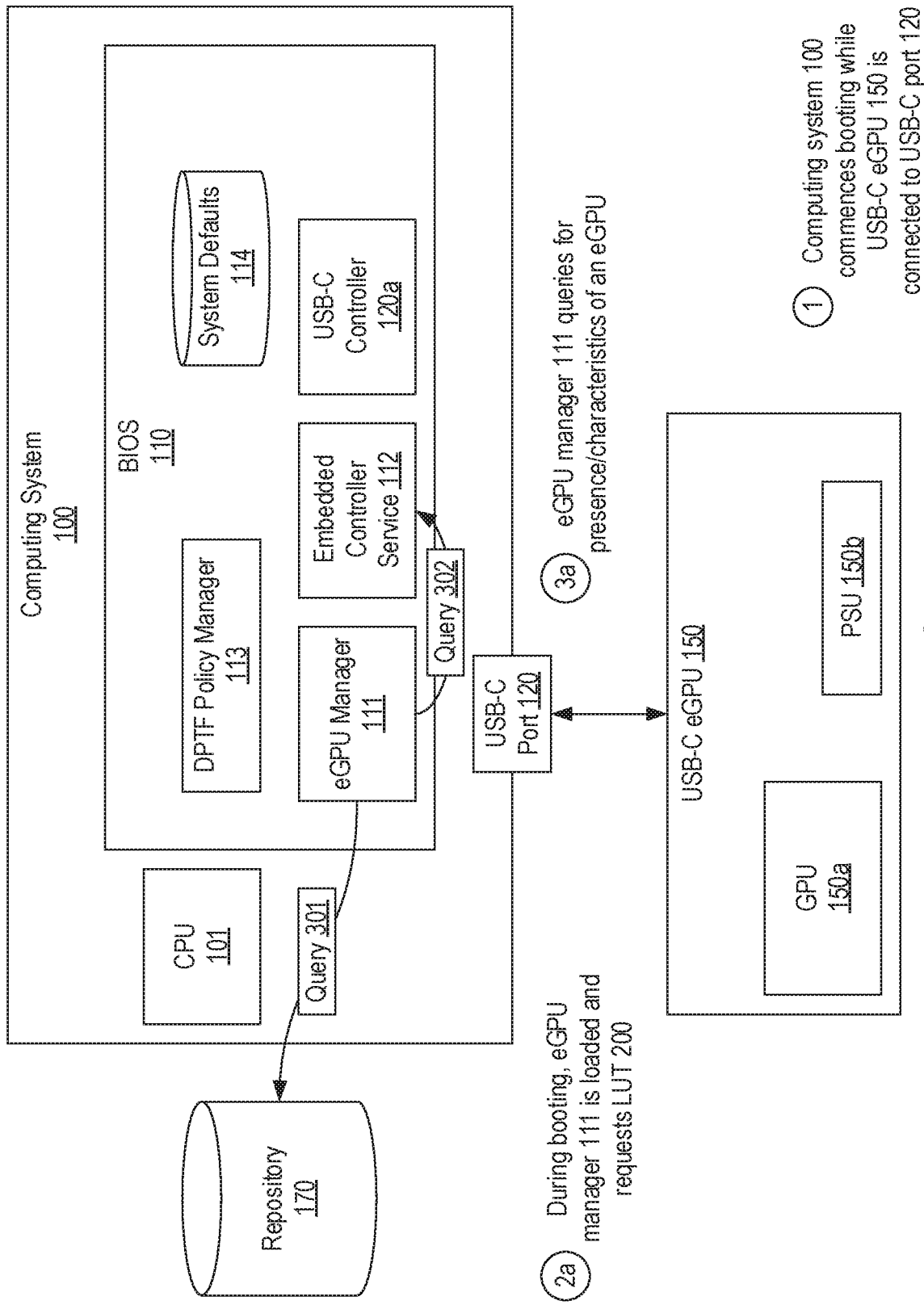
FIGS. 3A-3D provide an example of how a eGPU manager can dynamically configuring a computing system to operate with an eGPU that is connected to the computing system via a USB-C port.

FIGS. 3A-3D provide an example of how eGPU manager 111 can dynamically configure computing system 100 to operate with an eGPU that is connected to USB-C port 120. In this example, it is assumed that computing system 100 includes an embedded controller (not shown) and that embedded controller service 112 is installed to provide an interface to eGPU manager 111 for accessing functionality of USB-C controller 120a. It is also assumed that USB-C eGPU 150 is physically connected to USB-C port 120 and includes PSU 150b. In this context, FIG. 3A depicts that in step 1, computing system 100 commences booting while USB-C eGPU 150 is connected to USB-C port 120. As part of booting computing system 100, in step 2a, eGPU manager 111 is loaded (e.g., as a UEFI runtime service) and sends a query 301 to repository 170 to retrieve lookup table (LUT) 200. As part of booting computing system 100, in step 3a, eGPU manager 111 may also send query 302 to embedded controller service 112. Query 302 can represent a request to identify the presence and capabilities of any eGPU that is connected to USB-C port 120 (or any other USB-C port that computing system 100 may have). Query 302 can be in any suitable form but, in some embodiments, may comply with the ACPI Embedded Controller Interface.

Figure 3B:
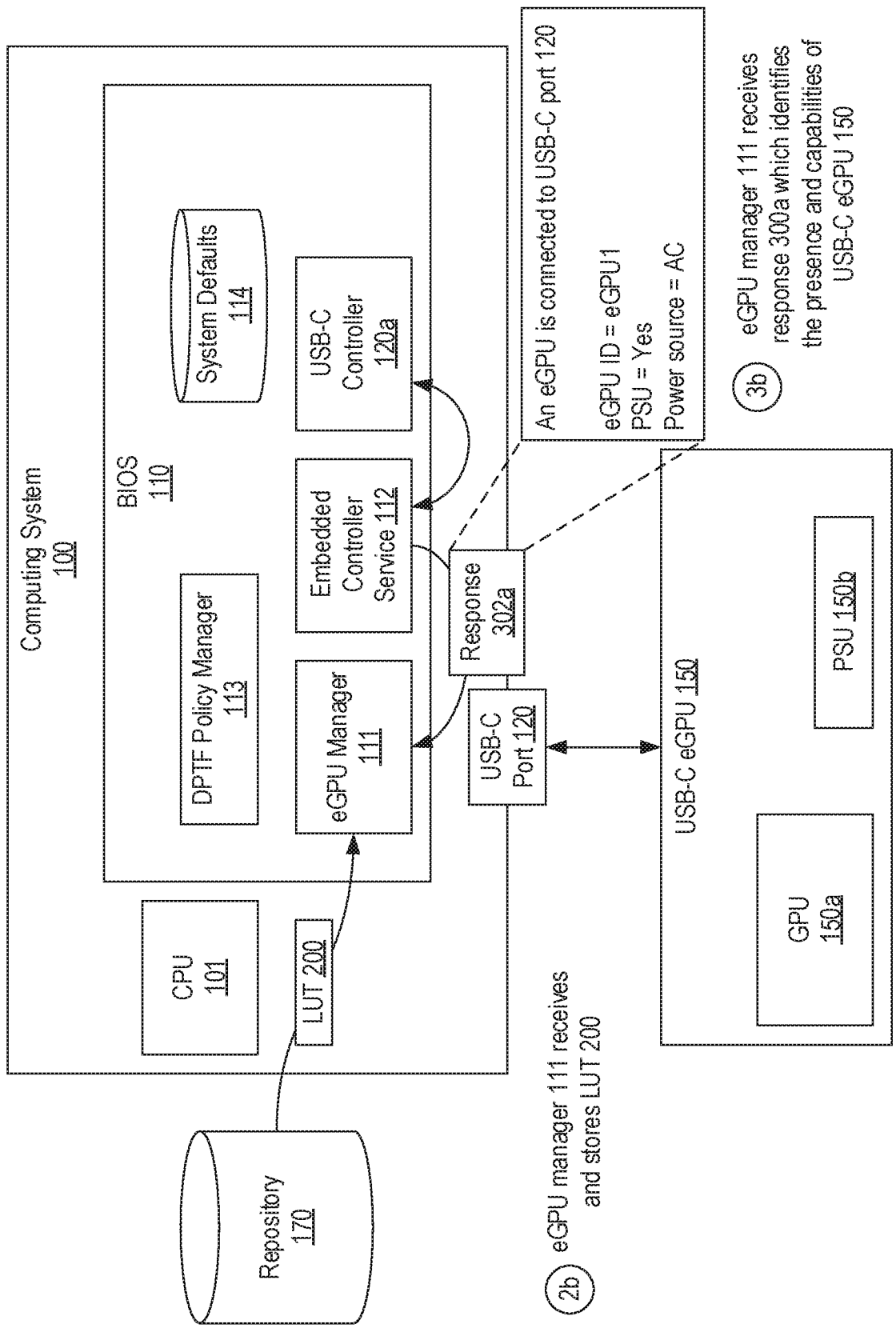

Turning to FIG. 3B, in response to query 301, eGPU manager 111 receives and stores lookup table 200 in step 2b. Also, in response to query 302, embedded controller service 112 can interface with USB-C controller to identify that USB-C eGPU 150 is connected to USB-C port 120 and to obtain an identifier and characteristics of USB-C eGPU 150. Then, in step 3b, eGPU manager 111 can receive response 302a from embedded controller service 112. As represented, response 302a can indicate that an eGPU is connected to USB-C port 120 and can provide the identifier and characteristics of the connected eGPU. For this example, it is assumed that USB-C eGPU 150 has an identifier of eGPU1, includes PSU 150b and is being powered by an AC source.

In embodiments where it may be able to communicate directly with USB-C controller 120a, eGPU manager 111 may send query 302 directly to USB-C controller 120a to retrieve the information represented in response 302a. Alternatively, when it has direct access to USB-C controller 120a, eGPU manager 111 may be configured to listen for USB-C events (e.g., connect events, disconnect events, power consumption change events, IO speed change events, etc.) and obtain such information when such events occur. Additionally, although FIGS. 3A and 3B depict that eGPU manager 111 performs steps 3a and 3b during the booting of computing system 100, eGPU manager 111 can perform the same or similar steps during runtime in order to detect when an eGPU is connected to or disconnected from USB-C port 120, to detect when a connected eGPU changes state, and the like. In short, eGPU manager 111 may employ a number of different techniques at a number of different times to determine when an eGPU is connected to USB-C port 120 and to identify characteristics of a connected eGPU.

Figure 3C:
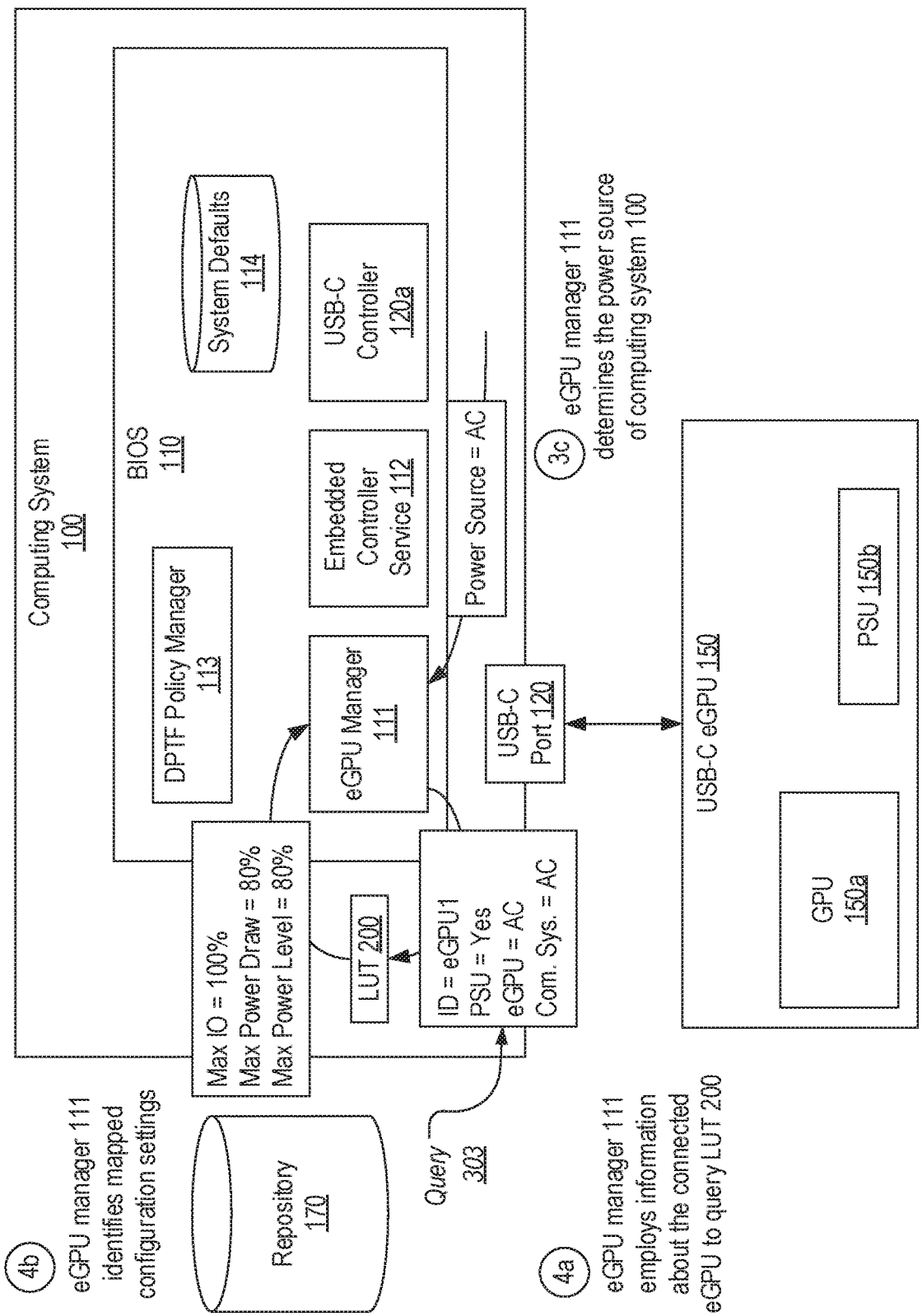

In addition to detecting that USB-C eGPU 150 is connected to USB-C port 120 and identifying its characteristics (e.g., whether it includes a PSU, whether it is being powered by an AC or DC source, etc.), eGPU manager 111 can also identify any appropriate characteristics of computing system 100. For example, FIG. 3C illustrates step 3c in which eGPU manager 111 determines that computing system 100 is currently running off an AC power source (e.g., that computing system 100 is currently plugged in). eGPU manager 111 may typically make this determination by querying an ACPI power source object on computing system 100 but any available technique could be used.

Once eGPU manager 111 has identified an eGPU that is connected to USB-C port 120, determined any applicable characteristics of the connected eGPU and determined any applicable characteristics of computing system 100, eGPU manager 111 can query lookup table 200 to retrieve the values of the configuration settings that are mapped to the connected eGPU and the applicable characteristics. For example, in step 4a, eGPU manager 111 is shown as making a query 303 to lookup table 200 to find an entry that includes an eGPU ID of eGPU1 and that includes Yes, AC and AC for the three characteristics (the "input values"). With reference to FIG. 2, query 303 will match the first entry in lookup table 200. Accordingly, in step 4b, eGPU manager 111 will determine that values of 100%, 80% and 80% for the three configuration settings are mapped to these input values. As indicated above, in embodiments where eGPU manager 111 does not retrieve and store lookup table 200, eGPU manager 111 may send the input values to repository 170 to retrieve the mapped values for the configuration settings.

In some embodiments, eGPU manager 111 may identify a matching entry in lookup table based only on the identifier of the eGPU or based on the identifier of the eGPU and some subset of the characteristics included in lookup table 200's entries. For example, if query 303 instead indicated that both USB-C eGPU 150 and computing system 100 were currently running from a DC source, lookup table 200 would not include an entry that matches all input values of query 303. In such a case, eGPU manager 111 could select the closest entry that matches the eGPU ID and retrieve the mapped values for the configuration settings from this closest matching entry. eGPU manager 111 could be configured to determine a closest matching entry in various ways. For example, when the input values for the characteristics do not completely match a single entry but lookup table 200 includes more than one entry that matches the input eGPU ID, eGPU manager 111 may be configured to select the entry with the lowest values for the configuration settings. On the other hand, if lookup table 200 does not include any entry that matches the eGPU ID, eGPU manager 111 can select a default entry and retrieve the values for the configuration settings from that default entry. In such cases, there could be multiple default entries and eGPU manager 111 could select a default entry by matching input characteristics.

Figure 3D:
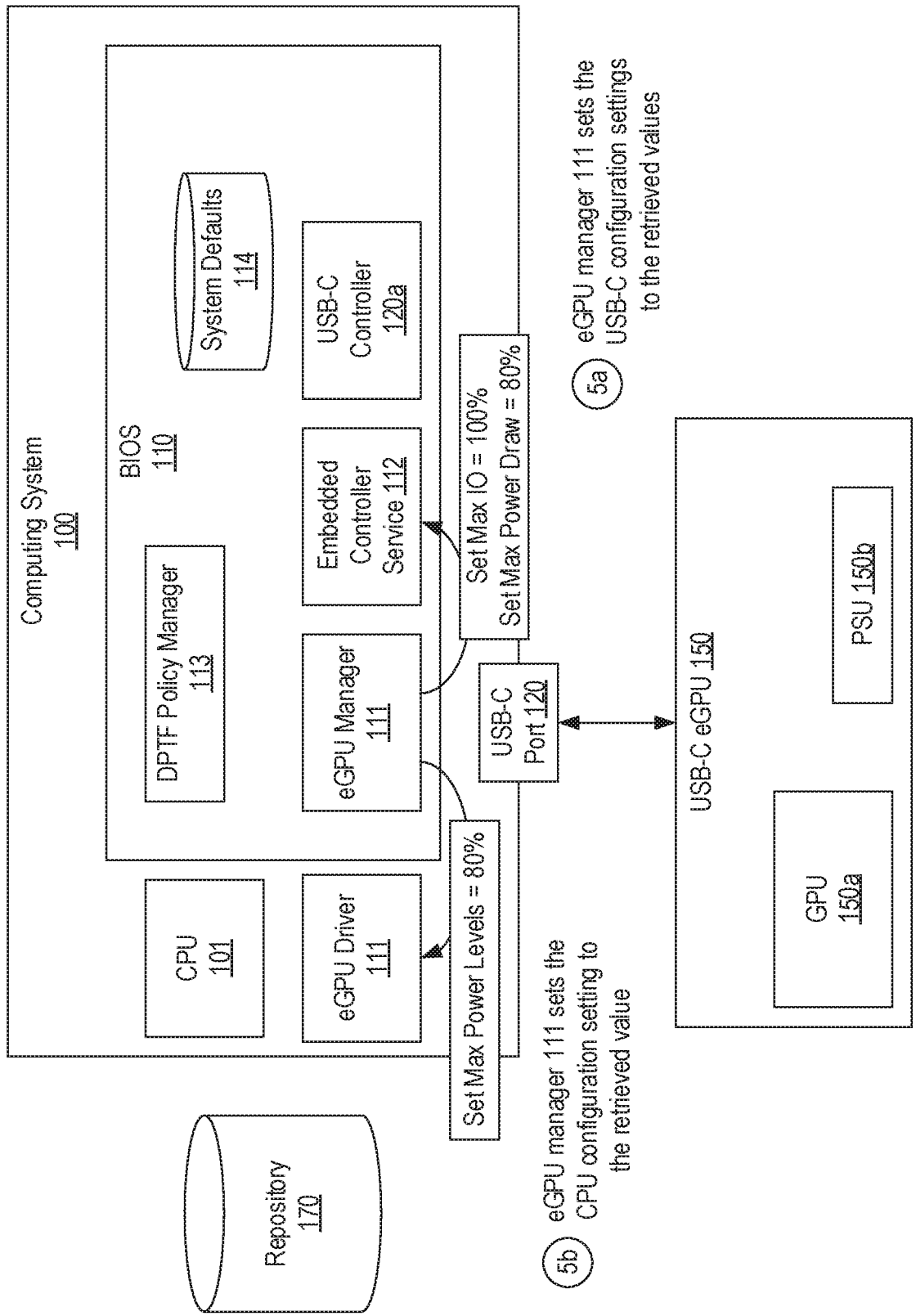

Turning to FIG. 3D, once it has retrieved the values for the configuration settings, eGPU manager 111 can interface with the appropriate components on computing system 100 to set the configuration settings to the retrieved values. For example, in step 5a, eGPU manager 111 is shown as interfacing with embedded controller service 112 to set the max IO speed and max power draw configuration settings for USB-C port 120 to 100% and 80% respectively. In typical implementations, an ACPI API will be exposed on computing system 100 by which embedded controller service 112 can set these configuration settings to the specified values.

Similarly, in step 5b, eGPU manager 111 is shown as interfacing with an eGPU driver 111 to set the max power levels of CPU 101 to 80% of their default levels. For example, eGPU driver 111 may implement ACPI APIs that enable eGPU manager 111 to set the max power levels. eGPU driver 111 may in turn interface with DPTF policy manager 113 to cause the power levels of CPU 101 to be set to the specified levels. As suggested above, system defaults 114 may define power levels for various power modes. For example, for an Intel CPU, PL1 represents the steady state power level while PL2 represents the short-term maximum power level both of which may define a maximum and a minimum value for each power level e.g., PL1max-PL1min and PL2max-PL2 min). In such cases, a result of step 5b can be the setting of these maximum and minimum values to 80% of their default values (assuming they had not been previously reduced). This can prevent CPU 101 from having turbo or other spike issues while the eGPU is connected to USB-C port 120.

By performing this process, eGPU manager 111 can minimize and typically eliminate the occurrence of errors when an eGPU is connected to USB-C port 120. More specifically, the values of the configuration settings that have been determined to be optimal for computing system 100 when the specific type of eGPU is connected should ensure that computing system 100 does not fail to boot or otherwise stop operating properly due to a lack of resources. Notably, such failures are prevented without requiring the end user to perform any manual adjustments (e.g., disabling the iGPU and/or dGPU).

The present invention should not be limited to any particular use cases. However, the following use cases illustrate some of the benefits the present invention may provide. When an eGPU is connected to USB-C port 120 and has an underpowered PSU, no PSU or is running on battery, the eGPU will likely draw significant power through USB-C port 120 via USB-C PD techniques. In such cases, and absent the present invention, computing system 100 may not boot or may crash due to insufficient power because the amount of power drawn through USB-C port 120 by the eGPU is not bound by computing system 100's firmware. With the present invention, however, eGPU manager 111 can detect the presence of such eGPUs, determine whether computing system 100 is running off an AC or DC source and employ lookup table 200 to identify and set the values of the configuration settings that will prevent the eGPU from drawing excessive power through USB-C port 120.

Similarly, if a powerful eGPU is connected to a computing system having a relatively weak CPU, absent the present invention, the eGPU may cause the CPU to spike and overheat. With the present invention, however, eGPU manager 111 can again detect the presence of such eGPUs and employ lookup table 200 to identify the set of values that will prevent such spikes. As another example, if an eGPU is connected to a computing system that is running on DC power, eGPU manager 111 can identify the set of values that will cause the computing system to best implement power sharing techniques (e.g., to maximize performance of the eGPU without excessively degrading the computing system's DC runtime). As can be seen, providing a lookup table that is specific to the computing system and that maps particular eGPUs and characteristics of the eGPUs and computing system to the optimal values for the configuration settings enables this dynamic configuration to be performed in many different use cases.

As mentioned above, eGPU manager 111 can be configured to periodically check for, listen for or otherwise detect the connection/disconnection of an eGPU and changes in the state of a connected eGPU. Accordingly, the above-described process of retrieving and setting the optimal values for the configuration settings can be repeatedly performed while computing system 100 is running. Continuing the example of FIGS. 3A-3D, if the end user disconnects USB-C eGPU 150 from USB-C port 120, eGPU manager 111 could detect this disconnection and cause the configuration settings to be reverted to their default (or previously set) values. Similarly, if the end user subsequently connected PCIe eGPU 151 to USB-C port 120, eGPU manager 111 could detect and identify the eGPU, detect any appropriate characteristics of the eGPU and computing system (e.g., whether they are running off an AC or DC source), retrieve the values that are mapped to the eGPU ID and characteristics and then set the configuration settings to these values. Assuming that PCIe eGPU 151 has an ID of eGPU2 and that computing system 100 is running off an AC source, eGPU manager 111 could retrieve values of 60%, 50% and 40% from lookup table 200 and set them.

Figure 4:
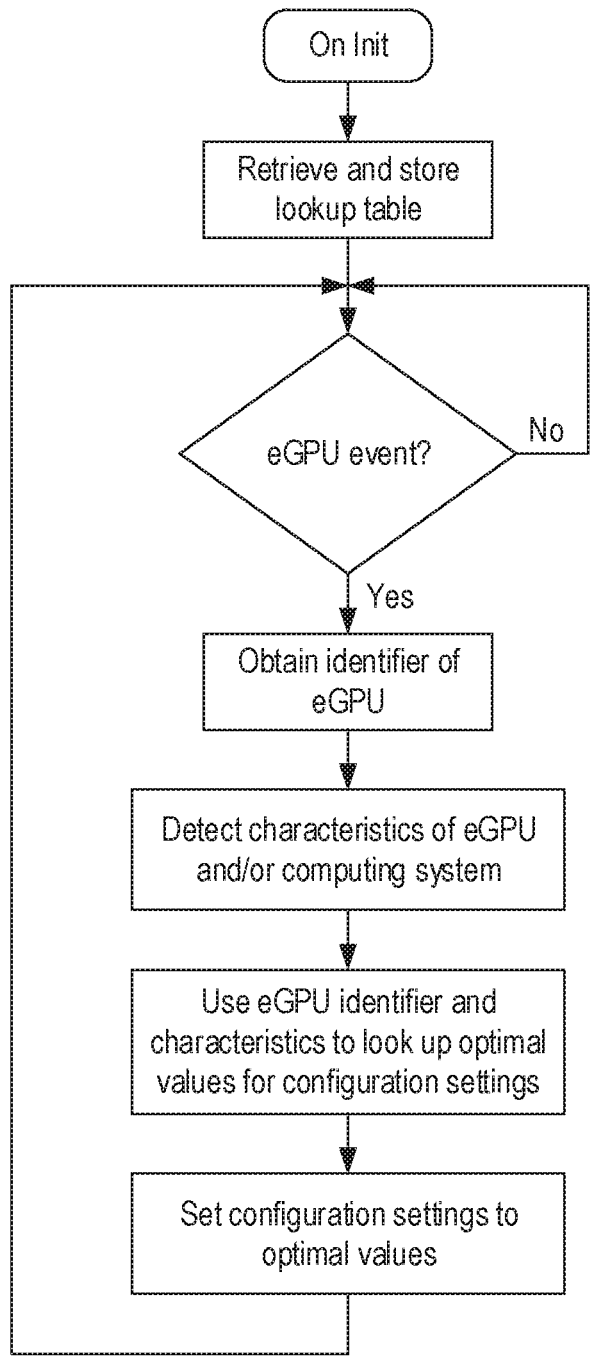
FIG. 4 provides a flowchart representing how an eGPU manager can dynamically configure a computing system to operate with an eGPU that is connected via a USB-C port in accordance with some embodiments of the present invention.

FIG. 4 provides a flowchart representing how an eGPU manager can dynamically configure a computing system to operate with an eGPU that is connected via a USB-C port in accordance with some embodiments of the present invention. As shown, when an eGPU manager is initialized, it can retrieve and store a lookup table. In some cases, the eGPU manager can employ an identifier of the computing system to retrieve a lookup table that is specific to the computing system. The eGPU manager can then detect when an eGPU event occurs on the computing system. For example, the eGPU manager can periodically query the USB subsystem to detect when an eGPU has been connected, directly listen for USB-C connect events, detect and/or listen for a change in the CPU's power consumption that may be indicative of an eGPU being connected (e.g., turbo mode), detect and/or listen for a change in the IO speed of the USB-C port that may be indicative of an eGPU being connected, or perform any other functionality to detect or be notified of the connection of an eGPU to a USB-C port.

When the eGPU manager detects that an eGPU is connected to a USB-C port, it can obtain an identifier of the eGPU, optionally detect characteristics of the eGPU (e.g., whether it includes a PSU and/or whether it is being powered by an AC or DC source) and optionally detect characteristics of the computing system (e.g., whether it is being powered by an AC or DC source). The eGPU manager can then use the eGPU identifier and possibly some or all of the detected characteristics to access the lookup table and retrieve the corresponding optimal values for configuration settings. The eGPU manager can then set the configuration setting to the optimal values. After setting the configuration settings to the optimal values, the eGPU manager can again commence waiting for eGPU events.

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media are categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similarly storage medium which can be used to store desired program code means in the form of computer-executable instructions or data structures and which can be accessed by a general purpose or special purpose computer. Transmission media include signals and carrier waves. Because computer storage media and transmission media are disjoint categories, computer storage media does not include signals or carrier waves.

Computer-executable instructions comprise, for example, instructions and data which, when executed by a processor, cause a general purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A method, performed by an external graphics processing unit (eGPU) manager, for dynamically configuring a computing system to operate with an eGPU that is connected to the computing system via a USB-C port, the method comprising:
   detecting that an eGPU is connected to a USB-C port of the computing system;
   in response to the detection, obtaining an identifier of the eGPU;
   employing the identifier of the eGPU to query a lookup table to thereby obtain one or more optimal values for one or more configuration settings of the computing system that are mapped to the identifier of the eGPU; and
   configuring the computing system to operate with the eGPU that is connected to the computing system via a USB-C port by setting the one or more configuration settings of the computing system to the one or more optimal values, the one or more configuration settings of the computing system comprising one or more of:
   a maximum IO speed of the USB-C port; or
   a maximum power draw of the USB-C port.

2. The method of claim 1, further comprising:
   receiving the lookup table from a repository; and
   storing the lookup table on the computing system;

wherein employing the identifier of the eGPU to query the lookup table comprises accessing the lookup table that is stored on the computing system.

3. The method of claim 1, wherein employing the identifier of the eGPU to query the lookup table comprises sending the identifier of the eGPU to a repository that stores the lookup table.

4. The method of claim 1, wherein the one or more configuration settings include one or more maximum power levels of a CPU of the computing system.

5. The method of claim 1, wherein the one or more configuration settings include each of:
the maximum IO speed of the USB-C port;
the maximum power draw of the USB-C port; and
one or more maximum power levels of a CPU of the computing system.

6. The method of claim 1, further comprising:
in conjunction with obtaining the identifier of the eGPU, detecting one or more characteristics of the eGPU or the computing system;
wherein employing the identifier of the eGPU to query the lookup table comprises employing the identifier of the eGPU and the one or more characteristics to query the lookup table.

7. The method of claim 6, wherein the one or more characteristics include whether the computing system is being powered by an AC or a DC source.

8. The method of claim 7, wherein the one or more characteristics also include one or more of whether the eGPU includes a power supply unit or whether the eGPU is being powered by an AC or DC source.

9. The method of claim 1, wherein detecting that the eGPU is connected to the USB-C port of the computing system comprises interfacing with one of:
a USB-C controller; or
an embedded controller service for an embedded controller that manages a USB-C controller.

10. The method of claim 1, wherein configuring the computing system to operate with the eGPU by setting the one or more configuration settings to the one or more optimal values comprises interfacing with one or more of:
a USB-C controller;
an embedded controller service for an embedded controller that manages a USB-C controller; or
a driver for the eGPU.

11. The method of claim 1, wherein the eGPU is detected during booting of the computing system.

12. The method of claim 1, wherein the eGPU is detected after the computing system has booted.

13. One or more computer storage media storing computer executable instructions which when executed on a computing system implement a method for dynamically configuring the computing system to operate with an eGPU that is connected to the computing system via a USB-C port, the method comprising:
detecting that an eGPU is connected to a USB-C port of the computing system;
detecting one or more characteristics of the eGPU or of the computing system, the one or more characteristics including one or more of:
whether the eGPU includes a power supply unit; or
whether the eGPU is being powered by an AC or DC source;
in response to the detection, generating a query to obtain one or more values for one or more configuration settings of the computing system from a lookup table, the query including an identifier of the eGPU and the one or more characteristics; and
configuring the computing system to operate with the eGPU that is connected to the USB-C port of the computing system by setting the one or more configuration settings of the computing system to the one or more obtained values, the one or more configuration settings of the computing system comprising one or more of:
a maximum IO speed of the USB-C port; or
a maximum power draw of the USB-C port.

14. The computer storage media of claim 13, wherein the lookup table is stored on the computing system.

15. The computer storage media of claim 14, wherein the lookup table is retrieved and stored on the computing system while the computing system boots.

16. The computer storage media of claim 13, wherein the one or more configuration settings include each of:
the maximum IO speed of the USB-C port;
the maximum power draw of the USB-C port; and
one or more maximum power levels of a CPU of the computing system.

17. A computing system comprising:
a CPU;
a USB-C port; and
an eGPU manager that, when executed, performs the following:
detects that an eGPU is connected to the USB-C port;
in response to the detection, obtains an identifier of the eGPU;
employs the identifier of the eGPU to query a lookup table to thereby obtain optimal values for configuration settings of the computing system that are mapped to the identifier of the eGPU; and
configures the computing system to operate with the eGPU that is connected to the USB-C port by setting the configuration settings of the computing system to the optimal values, the configuration settings of the computing system comprising one or more of:
a maximum IO speed of the USB-C port; or
a maximum power draw of the USB-C port.

18. The computing system of claim 17, wherein the configuration settings include each of:
the maximum IO speed of the USB-C port;
the maximum power draw of the USB-C port; and
one or more maximum power levels of the CPU.

19. The computing system of claim 17, wherein the eGPU manager also detects a type of power source that is currently powering the computing system and employs the type of power source and the identifier of the eGPU to query the lookup table such that the optimal values for the configuration settings that the query obtains are mapped to the identifier of the eGPU and to the type of power source.

20. The computing system of claim 17, wherein the eGPU manager receives the lookup table from a repository and stores the lookup table on the computing system.

* * * * *